(12) United States Patent
Stainvas Olshansky et al.

(10) Patent No.: US 9,733,350 B2
(45) Date of Patent: Aug. 15, 2017

(54) VEHICLE RADAR CONTROL

(71) Applicant: GM GLOBAL TECHNOLOGY OPERATIONS LLC, Detroit, MI (US)

(72) Inventors: Inna Stainvas Olshansky, Modiin (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 504 days.

(21) Appl. No.: 14/323,387

(22) Filed: Jul. 3, 2014

(65) Prior Publication Data
US 2016/0003939 A1    Jan. 7, 2016

(51) Int. Cl.
*G01S 13/93* (2006.01)
*G01S 7/41* (2006.01)
*G01S 13/28* (2006.01)
*G01S 13/42* (2006.01)
*G01S 13/06* (2006.01)
*G01S 13/02* (2006.01)
*G01S 13/89* (2006.01)

(52) U.S. Cl.
CPC ........... *G01S 13/06* (2013.01); *G01S 7/41* (2013.01); *G01S 13/02* (2013.01); *G01S 13/89* (2013.01); *G01S 13/931* (2013.01); *G01S 13/426* (2013.01)

(58) Field of Classification Search
CPC . G01S 7/41; G01S 7/411; G01S 7/412; G01S 13/06; G01S 13/28; G01S 13/42; G01S 13/426; G01S 13/93; G01S 13/931
USPC .................................................. 342/70–72
See application file for complete search history.

(56) References Cited

U.S. PATENT DOCUMENTS

| 4,833,469 | A | * | 5/1989 | David | B60K 31/0008 |
| | | | | | 180/169 |
| 5,467,072 | A | * | 11/1995 | Michael | G01S 13/931 |
| | | | | | 340/436 |
| 5,610,620 | A | | 3/1997 | Stites et al. | |
| 5,751,240 | A | * | 5/1998 | Fujita | G01S 13/34 |
| | | | | | 342/107 |
| 5,767,793 | A | * | 6/1998 | Agravante | G01S 7/032 |
| | | | | | 180/167 |
| 5,973,648 | A | | 10/1999 | Lindenmeier et al. | |

(Continued)

FOREIGN PATENT DOCUMENTS

| CN | 101581780 A | 11/2009 |
| CN | 102879777 A | 1/2013 |
| CN | 102944876 A | 2/2013 |

OTHER PUBLICATIONS

USPTO, Notice of Allowance and Fee(s) Due for U.S. Appl. No. 12/886,322 mailed Feb. 27, 2015.

(Continued)

*Primary Examiner* — Peter Bythrow
(74) *Attorney, Agent, or Firm* — Lorenz & Kopf, LLP

(57) ABSTRACT

Methods and systems are provided for controlling a radar system of a vehicle. One or more transmitters are configured to transmit radar signals. A plurality of receivers are configured to receive return radar signals after the transmitted radar signals are deflected from an object proximate the vehicle. A processor is coupled to the plurality of receivers, and is configured to generate a plurality of feature vectors based on the returned radar signals and generate a three dimensional representation of the object using the plurality of feature vectors.

20 Claims, 5 Drawing Sheets

(56) References Cited

U.S. PATENT DOCUMENTS

| | | | |
|---|---|---|---|
| 6,674,394 B1* | 1/2004 | Zoratti | B60Q 9/008 |
| | | | 180/169 |
| 6,680,689 B1* | 1/2004 | Zoratti | B60Q 9/008 |
| | | | 180/169 |
| 7,053,845 B1 | 5/2006 | Holloway et al. | |
| 7,224,309 B2* | 5/2007 | Shimomura | G01S 13/931 |
| | | | 340/435 |
| 7,868,817 B2* | 1/2011 | Meyers | G01S 13/4454 |
| | | | 342/118 |
| 2003/0151541 A1* | 8/2003 | Oswald | B60R 21/01538 |
| | | | 342/70 |
| 2004/0117090 A1* | 6/2004 | Samukawa | B60K 31/0008 |
| | | | 701/45 |
| 2006/0262007 A1* | 11/2006 | Bonthron | G01S 13/34 |
| | | | 342/70 |
| 2009/0040501 A1* | 2/2009 | Matsuo | G01S 7/411 |
| | | | 356/4.01 |
| 2009/0184865 A1* | 7/2009 | Valo | G01S 7/412 |
| | | | 342/25 F |
| 2009/0322871 A1* | 12/2009 | Ji | G01S 7/412 |
| | | | 348/115 |
| 2010/0109938 A1* | 5/2010 | Oswald | G01S 7/2926 |
| | | | 342/90 |
| 2011/0102242 A1* | 5/2011 | Takeya | G01S 7/02 |
| | | | 342/105 |
| 2012/0035846 A1* | 2/2012 | Sakamoto | B60T 8/17558 |
| | | | 701/301 |
| 2012/0194377 A1* | 8/2012 | Yukumatsu | G01S 13/931 |
| | | | 342/70 |
| 2012/0313810 A1* | 12/2012 | Nogueira-Nine | G01S 7/354 |
| | | | 342/128 |
| 2014/0022113 A1* | 1/2014 | Nogueira-Nine | G01S 7/412 |
| | | | 342/128 |
| 2014/0049420 A1* | 2/2014 | Lehning | G01S 7/41 |
| | | | 342/109 |
| 2014/0077989 A1* | 3/2014 | Healy, Jr. | G01S 13/9035 |
| | | | 342/25 F |
| 2014/0176679 A1* | 6/2014 | Lehning | H04N 13/0275 |
| | | | 348/46 |
| 2015/0198711 A1* | 7/2015 | Zeng | G01S 13/726 |
| | | | 342/59 |

OTHER PUBLICATIONS

USPTO, Response to Designated New Ground of Rejection Pursuant to 37 C.F.R. Section 1.111 and Request to Reopen Prosecution Pursuant to 37 CFR Section 41.40 and MPEP Section 1207.03(B) for U.S. Appl. No. 12/886,322 mailed Aug. 4, 2014.

USPTO, Decision on Petition to Designate New Grounds of Rejection and Reopen Prosecution for U.S. Appl. No. 12/886,322 mailed Jun. 12, 2014.

USPTO, Petition to Designate a New Ground of Rejection and to Reopen Prosecution under 37 C.F.R. Sections 1.181 and 41.40 and MPEP Section 2107.03(b) for U.S. Appl. No. 12/886,322 mailed Apr. 14, 2014 (087.0022).

USPTO, Examiner's Answer for U.S. Appl. No. 12/886,322 mailed Feb. 14, 2014.

State Intellectual Property Office of the People's Republic of China, Office Action in Chinese Patent Application No. 201510383757.8 dated Mar. 20, 2017.

Amit Kumar Mishra, et al., "Information sensing for radar target classification using compressive sensing," IRS 2012, 19th International Radar Symposium, May 23-25, Warsaw, Poland, pp. 326-330.

Ming-Hua Xue, et al., "Research on Three-Dimensional Imaging Algorithm of Radar Target," Radar Science and Technology, vol. 11, No. 1, Feb. 2013, pp. 65-70.

* cited by examiner

VEHICLE RADAR CONTROL

TECHNICAL FIELD

The present disclosure generally relates to vehicles, and more particularly relates to methods and radar systems for vehicles.

BACKGROUND

Certain vehicles today utilize radar systems. For example, certain vehicles utilize radar systems to detect other vehicles, pedestrians, or other objects on a road in which the vehicle is travelling. Radar systems may be used in this manner, for example, in implementing automatic braking systems, adaptive cruise control, and avoidance features, among other vehicle features. Certain vehicle radar systems, called multiple input, multiple output (MIMO) radar systems, have multiple transmitters and receivers. While radar systems are generally useful for such vehicle features, in certain situations existing radar systems may have certain limitations.

Accordingly, it is desirable to provide improved techniques for radar system performance in vehicles, for example for classification of objects using MIMO radar systems. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for controlling a radar system of a vehicle, the radar system having a plurality of receivers. The method comprises receiving radar signals pertaining to an object via each of the plurality of receivers, generating a plurality of feature vectors based on the radar signals, and generating a three dimensional representation of the object using the plurality of feature vectors.

In accordance with an exemplary embodiment, a radar control system for a vehicle is provided. The radar control system comprises one or more transmitters, a plurality of receivers, and a processor. The one or more transmitters are configured to transmit radar signals. The plurality of receivers are configured to receive return radar signals after the transmitted radar signals are deflected from an object proximate the vehicle. The processor is coupled to the plurality of receivers, and is configured to generate a plurality of feature vectors based on the radar signals and generate a three dimensional representation of the object using the plurality of feature vectors.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
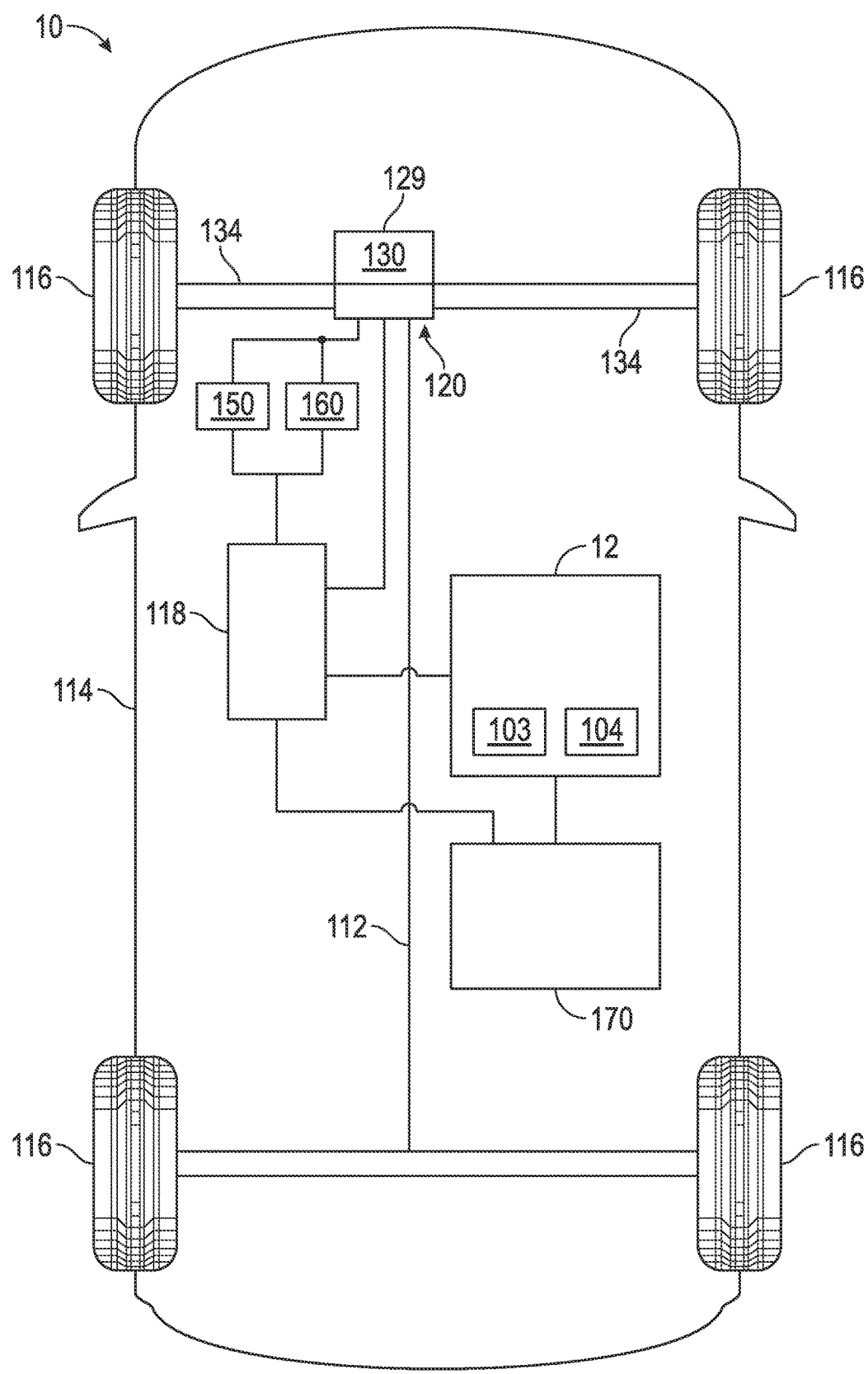
FIG. 1 is a functional block diagram of a vehicle having a control system, including a radar system, in accordance with an exemplary embodiment.

FIG. 1 provides a functional block diagram of vehicle 10, in accordance with an exemplary embodiment. As described in further detail greater below, the vehicle 10 includes a radar control system 12 having a radar system 103 and a controller 104 that classifies objects based upon a three dimensional representation of the objects using received radar signals of the radar system 103.

In the depicted embodiment, the vehicle 10 also includes a chassis 112, a body 114, four wheels 116, an electronic control system 118, a steering system 150, and a braking system 160. The body 114 is arranged on the chassis 112 and substantially encloses the other components of the vehicle 10. The body 114 and the chassis 112 may jointly form a frame. The wheels 116 are each rotationally coupled to the chassis 112 near a respective corner of the body 114.

In the exemplary embodiment illustrated in FIG. 1, the vehicle 10 includes an actuator assembly 120. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is also mechanically coupled to a transmission. In other embodiments, the engine 130 may instead be coupled to a generator used to power an electric motor that is mechanically coupled to a transmission.

The steering system 150 is mounted on the chassis 112, and controls steering of the wheels 116. The steering system 150 includes a steering wheel and a steering column (not depicted). The steering wheel receives inputs from a driver of the vehicle 10. The steering column results in desired steering angles for the wheels 116 via the drive shafts 134 based on the inputs from the driver.

The braking system 160 is mounted on the chassis 112, and provides braking for the vehicle 10. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle 10, as well as various other inputs for various vehicle devices and/or systems, such as one or more vehicle radios, other entertainment or infotainment systems, environmental control systems, lightning units, navigation systems, and the like (not depicted in FIG. 1).

Also as depicted in FIG. 1, in certain embodiments the vehicle 10 may also include a telematics system 170. In one such embodiment the telematics system 170 is an onboard device that provides a variety of services through communication with a call center (not depicted) remote from the vehicle 10. In various embodiments the telematics system may include, among other features, various non-depicted features such as an electronic processing device, one or more types of electronic memory, a cellular chipset/component, a wireless modem, a dual mode antenna, and a navigation unit containing a GPS chipset/component. In certain embodiments, certain of such components may be included in the controller 104, for example as discussed further below in connection with FIG. 2. The telematics system 170 may provide various services including: turn-by-turn directions and other navigation-related services provided in conjunction with the GPS chipset/component, airbag deployment notification and other emergency or roadside assistance-related services provided in connection with various sensors and/or sensor interface modules located throughout the vehicle, and/or infotainment-related services such as music, internet web pages, movies, television programs, videogames, and/or other content.

The radar control system 12 is mounted on the chassis 112. As mentioned above, the radar control system 12 classifies objects based upon a three dimensional representation of the objects using received radar signals of the radar system 103. In one example, the radar control system 12 provides these functions in accordance with the method 400 described further below in connection with FIG. 4.

While the radar control system 12, the radar system 103, and the controller 104 are depicted as being part of the same system, it will be appreciated that in certain embodiments these features may comprise two or more systems. In addition, in various embodiments the radar control system 12 may comprise all or part of, and/or may be coupled to, various other vehicle devices and systems, such as, among others, the actuator assembly 120, and/or the electronic control system 118.

Figure 2:
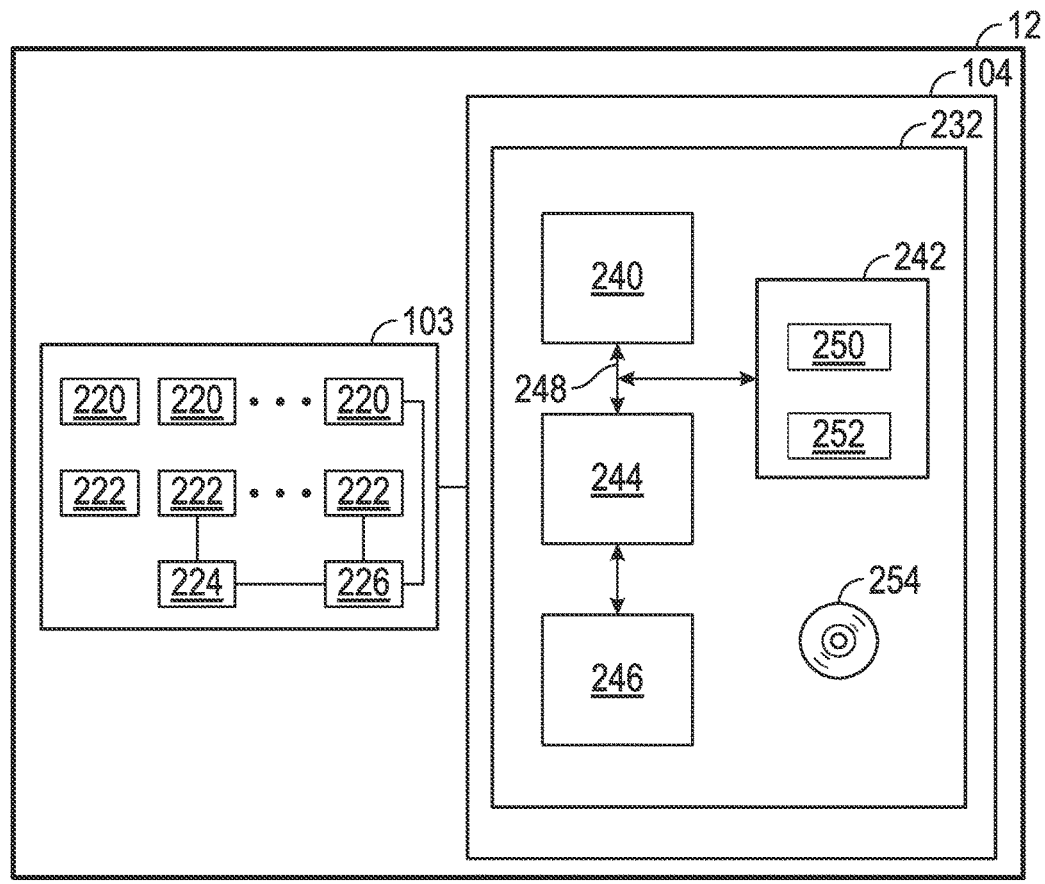
FIG. 2 is a functional block diagram of the control system of the vehicle of FIG. 1, including the radar system, in accordance with an exemplary embodiment.

With reference to FIG. 2, a functional block diagram is provided for the radar control system 12 of FIG. 1, in accordance with an exemplary embodiment. As noted above, the radar control system 12 includes the radar system 103 and the controller 104 of FIG. 1.

As depicted in FIG. 2, the radar system 103 includes one or more transmitters 220, one or more receivers 222, a memory 224, and a processing unit 226. In the depicted embodiment, the radar system 103 comprises a multiple input, multiple output (MIMO) radar system with multiple transmitters (also referred to herein as transmission channels) 220 and multiple receivers (also referred to herein as receiving channels) 222. The transmitters 220 transmit radar signals for the radar system 103. After the transmitted radar signals contact one or more objects on or near a road on which the vehicle 10 is travelling and is reflected/redirected toward the radar system 103, the redirected radar signals are received by the receivers 222 of the radar system 103 for processing.

Figure 3:
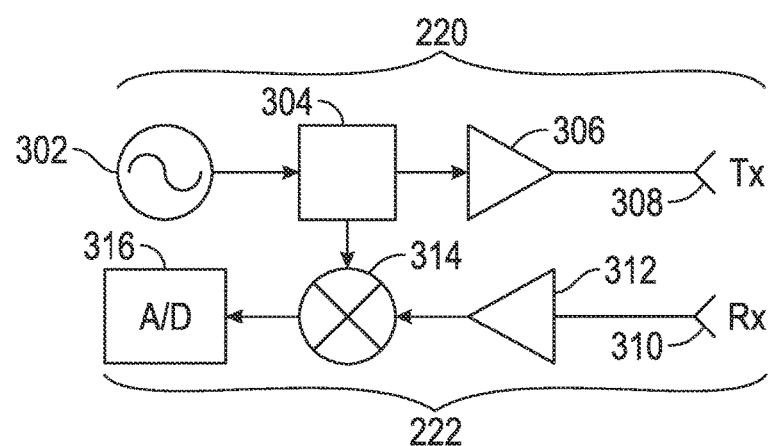
FIG. 3 is a functional block diagram of a transmission channel and a receiving channel of the radar system of FIGS. 1 and 2, in accordance with an exemplary embodiment.

With reference to FIG. 3, a representative one of the transmission channels 220 is depicted along with a respective one of the receiving channels 222 of the radar system of FIG. 3, in accordance with an exemplary embodiment. As depicted in FIG. 3, each transmitting channel 220 includes a signal generator 302, a filter 304, an amplifier 306, and an antenna 308. Also as depicted in FIG. 3, each receiving channel 222 includes an antenna 310, an amplifier 312, a mixer 314, and a sampler/digitizer 316. In certain embodiments the antennas 308, 310 may comprise a single antenna, while in other embodiments the antennas 308, 310 may comprise separate antennas. Similarly, in certain embodiments the amplifiers 306, 312 may comprise a single amplifier, while in other embodiments the amplifiers 306, 312 may comprise separate amplifiers. In addition, in certain embodiments multiple transmitting channels 220 may share one or more of the signal generators 302, filters 304, amplifiers 306, and/or antennae 308. Likewise, in certain embodiments, multiple receiving channels 222 may share one or more of the antennae 310, amplifiers 312, mixers 314, and/or samplers/digitizers 316.

The radar system 103 generates the transmittal radar signals via the signal generator(s) 302. The transmittal radar signals are filtered via the filter(s) 304, amplified via the amplifier(s) 306, and transmitted from the radar system 103 (and from the vehicle 10 to which the radar system 103 belongs, also referred to herein as the "host vehicle") via the antenna(e) 308. The transmitting radar signals subsequently contact other vehicles and/or other objects on or alongside the road on which the host vehicle 10 is travelling. After contacting the other vehicles and/or other objects, the radar signals are reflected, and travel from the other vehicles and/or other objects in various directions, including some signals returning toward the host vehicle 10. The radar signals returning to the host vehicle 10 (also referred to herein as received radar signals) are received by the antenna (e) 310, amplified by the amplifier(s) 312, mixed by the mixer(s) 314, and digitized by the sampler(s)/digitizer(s) 316.

Returning to FIG. 2, the radar system 103 also includes, among other possible features, the memory 224 and the processing unit 226. The memory 224 stores information received by the receiver 222 and/or the processing unit 226. In certain embodiments, such functions may be performed, in whole or in part, by a memory 242 of a computer system 232 (discussed further below).

The processing unit 226 processes the information obtained by the receivers 222 for classification of objects based upon a three dimensional representation of the objects using received radar signals of the radar system 103. The processing unit 226 of the illustrated embodiment is capable of executing one or more programs (i.e., running software) to perform various tasks instructions encoded in the program(s). The processing unit 226 may include one or more microprocessors, microcontrollers, application specific integrated circuits (ASICs), or other suitable device as realized by those skilled in the art, such as, by way of example, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In certain embodiments, the radar system 103 may include multiple memories 224 and/or processing units 226, working together or separately, as is also realized by those skilled in the art. In addition, it is noted that in certain embodiments, the functions of the memory 224, and/or the processing unit 226 may be performed in whole or in part by one or more other memories, interfaces, and/or processors disposed outside the radar system 103, such as the memory 242 and the processor 240 of the controller 104 described further below.

As depicted in FIG. 2, the controller 104 is coupled to the radar system 103. Similar to the discussion above, in certain embodiments the controller 104 may be disposed in whole or in part within or as part of the radar system 103. In addition, in certain embodiments, the controller 104 is also coupled to one or more other vehicle systems (such as the electronic control system 118 of FIG. 1). The controller 104 receives and processes the information sensed or determined from the radar system 103, provides detection, classification, and tracking of based upon a three dimensional representation of the objects using received radar signals of the radar system 103, and implements appropriate vehicle actions based on this information. The controller 104 generally performs these functions in accordance with the method 400 discussed further below in connection with FIGS. 4-6.

As depicted in FIG. 2, the controller 104 comprises the computer system 232. In certain embodiments, the controller 104 may also include the radar system 103, one or more components thereof, and/or one or more other systems. In addition, it will be appreciated that the controller 104 may otherwise differ from the embodiment depicted in FIG. 2. For example, the controller 104 may be coupled to or may otherwise utilize one or more remote computer systems and/or other control systems, such as the electronic control system 118 of FIG. 1.

As depicted in FIG. 2, the computer system 232 includes the processor 240, the memory 242, an interface 244, a storage device 246, and a bus 248. The processor 240 performs the computation and control functions of the controller 104, and may comprise any type of processor or multiple processors, single integrated circuits such as a microprocessor, or any suitable number of integrated circuit devices and/or circuit boards working in cooperation to accomplish the functions of a processing unit. In one embodiment, the processor 240 classifies objects using radar signal spectrogram data in combination with one or more computer vision models. During operation, the processor 240 executes one or more programs 250 contained within the memory 242 and, as such, controls the general operation of the controller 104 and the computer system 232, generally in executing the processes described herein, such as those of the method 400 described further below in connection with FIGS. 4-6.

The memory 242 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 242 is located on and/or co-located on the same computer chip as the processor 240. In the depicted embodiment, the memory 242 stores the above-referenced program 250 along with one or more stored values 252 (such as, by way of example, information from the received radar signals and the spectrograms therefrom).

The bus 248 serves to transmit programs, data, status and other information or signals between the various components of the computer system 232. The interface 244 allows communication to the computer system 232, for example from a system driver and/or another computer system, and can be implemented using any suitable method and apparatus. The interface 244 can include one or more network interfaces to communicate with other systems or components. In one embodiment, the interface 244 includes a transceiver. The interface 244 may also include one or more network interfaces to communicate with technicians, and/or one or more storage interfaces to connect to storage apparatuses, such as the storage device 246.

The storage device 246 can be any suitable type of storage apparatus, including direct access storage devices such as hard disk drives, flash systems, floppy disk drives and optical disk drives. In one exemplary embodiment, the storage device 246 comprises a program product from which memory 242 can receive a program 250 that executes one or more embodiments of one or more processes of the present disclosure, such as the method 400 (and any sub-processes thereof) described further below in connection with FIGS. 4-6. In another exemplary embodiment, the program product may be directly stored in and/or otherwise accessed by the memory 242 and/or a disk (e.g., disk 254), such as that referenced below.

The bus 248 can be any suitable physical or logical means of connecting computer systems and components. This includes, but is not limited to, direct hard-wired connections, fiber optics, infrared and wireless bus technologies. During operation, the program 250 is stored in the memory 242 and executed by the processor 240.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 240) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 232 may also otherwise differ from the embodiment depicted in FIG. 2, for example in that the computer system 232 may be coupled to or may otherwise utilize one or more remote computer systems and/or other control systems.

Figure 4:
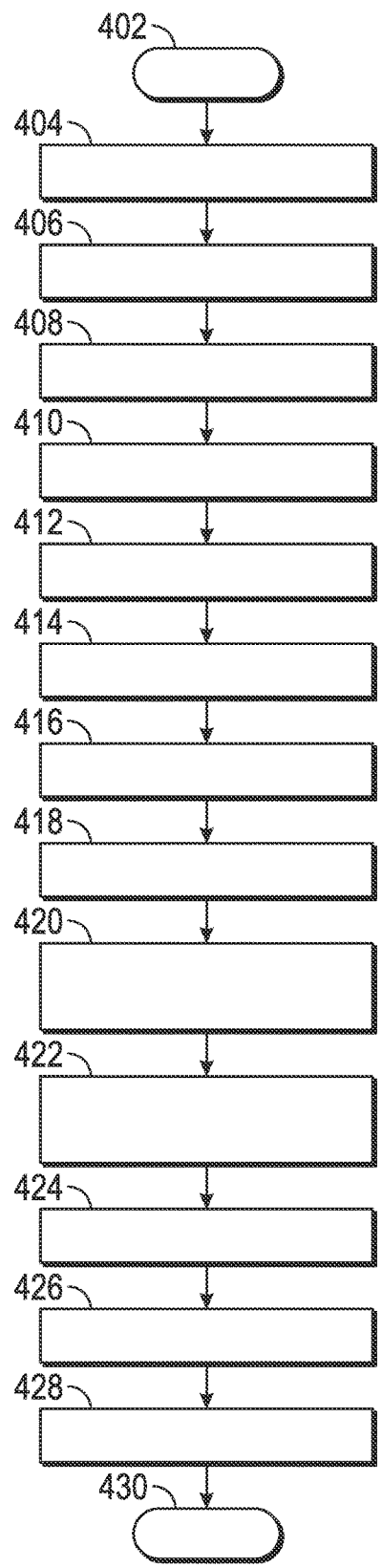
FIG. 4 is a flowchart of a method for controlling a radar system, which can be used in connection with the vehicle of FIG. 1, the control system of FIGS. 1 and 2, and the radar system of FIGS. 1-3, in accordance with an exemplary embodiment.

FIG. 4 is a flowchart of a method 400 for controlling a radar system for a vehicle, in accordance with an exemplary embodiment. The method 400 can be implemented in connection with the vehicle 10 of FIG. 1 and the radar control system 12 of FIGS. 1-3, in accordance with an exemplary embodiment. In various embodiments, the method can be scheduled to run at 402 based on predetermined events, and/or can run continually during operation of the vehicle 10.

As depicted in FIG. 4, the method 400 includes transmitting a first plurality of radar signals at 404. The radar signals are, in one example, transmitted via each of the plurality of transmitting channels 220 of the radar system 103 of the vehicle 10 of FIG. 1 while the vehicle 10 is driving in a road.

After the radar signals are reflected from objects on or around the road, return radar signals are received by the radar system 103 at 406 of FIG. 4. In one example, the received radar signals are received via each of the receiving channels 222 of the radar system 103 of the vehicle 10 (as referenced in FIGS. 1-3) after deflection from one or more objects (e.g. other vehicles, pedestrians, trees, rocks, debris, guard rails or other road components, and so on) on the road or otherwise in proximity to the vehicle 10 (vehicle 10 is also referred to herein as the "host vehicle").

The received radar signals are filtered at 408. In one embodiment, the received radar signals of 406 are passed through a filter bank stored in the memory 242 of FIG. 1 (and/or the memory 224 of FIG. 1) as stored values 252 therein. Also in one embodiment, the filter is provided by a processor, such as the processing unit 226 and/or the processor 240 of FIG. 1.

An object is identified in proximity to the vehicle at 410. Similar to the discussion above, as used throughout this Application, an object may comprise, among other possible examples, another vehicle, a pedestrian, a tree, a rock, debris, a guard rail or another road component, and so on, in proximity to the host vehicle 10. In one embodiment, the object is identified based on the received radar signals of 406 by a processor, such as the processing unit 226 and/or the processor 240 of FIG. 1. An object may be identified in this manner, for example, if the object is on or around a road in which the host vehicle 10 is travelling.

A location of the object of 410 is determined at 412. In addition, an azimuth angle for the object with respect to the host vehicle 10 is determined at 414, an elevation angle for the object with respect to the host vehicle 10 is determined at 416, and a range is determined for the object with respect to the host vehicle 10 at 418. In one embodiment, the location, azimuth angle, elevation angle, and range of 410-418 are determined for the object of 410 based on the received radar signals of 406 by a processor, such as the processing unit 226 and/or the processor 240 of FIG. 1.

The spatially distributed radar signals are processed at 420. In one embodiment, the radar signals are associated to a three dimensional (3D) array at 420. In one embodiment, the three dimensional representation comprises a union of the plurality of feature vectors (or patches) of 420 over a three dimensional array. Also in one embodiment, the array of 422 is constructed such that the array has a first dimension based on the azimuth angle of 414, a second dimension based on the elevation angle of 416, a third dimension based on the range of 418, and a center that is based on the location of the object of 412. In other embodiments, the radar signals may be associated to a two dimensional (2D) array. In yet another embodiment, the radar signals may be associated to different spatial positions. In one embodiment 420 is performed by a processor, such as the processing unit 226 and/or the processor 240 of FIG. 1.

Compressive sensing feature extraction is performed at 422. In one embodiment, during 420 features are extracted from the received radar signals using compressive sensing techniques. As used in this Application, compressive sensing techniques comprise techniques for finding radar signal decomposition dictionary in which signals are expressed compactly, for example as a technique for smart feature extraction. In one embodiment, 422 includes a signal processing technique for efficiently acquiring and reconstructing the radar signal by finding solutions to undetermined linear systems. In one such embodiment, a least squares mathematical solution may be utilized. In one embodiment, a plurality of feature vectors are generated at 422 based on the received radar signals using the compressive sensing techniques. In one such embodiment, a separate feature vector is generated for radar signals received from each of the plurality of receivers 222 of FIG. 2 using the compressive sensing techniques. Also in one embodiment, the feature vectors include values of frequencies for the signals received by the particular receivers 222 over a period of time using the compressive sensing techniques, based on information in the radar signals received at 406 after the filtering of 408. In one embodiment, energy signatures are generated for the radar signals using the compressive sensing techniques at 420. In one such embodiment, the plurality of features are compared as being associated with specific spatial locations. In one embodiment 422 is performed by a processor, such as the processing unit 226 and/or the processor 240 of FIG. 1.

The object is classified at 424. In one embodiment, the object is classified at 424 based on the three dimensional representation of 420 and the compressive sensing feature extraction of 422. In one embodiment, the classification comprises a predefined category or type of object (e.g., a pedestrian, another vehicle, a wall, and so). In another embodiment, the classification pertains to whether the object is of any concern (e.g. for possible impact). In certain embodiments, shape recognition may be performed as part of 424. In addition, in one embodiment, the classification of the object at 424 is performed by a processor, such as the processing unit 226 and/or the processor 240 of FIG. 1.

In one embodiment, the classification of 424 consists of a training stage (e.g., prior to a current vehicle ignition cycle) and then a real time classification (e.g., during a current vehicle ignition cycle). In one embodiment, during the training stage a smart dictionary is built per object (class) category, and then the per class dictionaries are merged. Subsequently, each signal is decomposed in a new merged dictionary and energy signatures are built with the components being a sum of the absolute decomposition coefficients per specific "object" dictionaries. The learned dictionary is stored in a memory, such as the memory 224 and/or the memory 244 of FIG. 2.

In one embodiment, a sparse dictionary learning is used based on a temporal gradient that captures a Doppler frequency shift with respect to radar signals deflected from the object (also referred to herein as the "target"). In one embodiment, the relatively short time interval the Doppler shift is proportional to the relative changes in the object's position. The sparse dictionary learning-based feature extraction reduces the data dimensionality to a small number, C, of basic target's directions of motion, whose combination is used to represent all other possible directions. Thus the proposed direction of motion estimation process can be presented in two stages. In the first stage the set of the C sparse dictionaries is learned from the training data. In the second stage any radar measurement that strongly depends on the target's direction of motion is decomposed in these dictionaries. These two stages are described in greater detail below.

First, in the dictionary learning phase, Let $\Lambda=\{(X^1, \theta^1), (X^2, \theta^2), \ldots, (X^C, \theta^C)\}$ be a dictionary training data set, where an $X \times N$ matrix $X^c = [x_1(\theta^c), x_2(\theta^c), \ldots, x_N(\theta^c)]$, $c=1, \ldots, C$ is the collection of the $X \times 1$ slow-time radar echos received from the radar control system from N spatial cells when observing the target moving with direction $\theta^c$. Each column of $X^c$ is split into U overlapping frames of the size K, thus forming the $K \times U$ data sample matrices1 $Y^c_i$, $i=1, \ldots, N$. The training data for the dictionary c contains the radar echoes obtained from all spatial cells of interest (cells that contain the target) and has the following form:

$$Y^c_{2KN \times U} = [R\{Y^c_1\}; I\{Y^c_1\}; R\{Y^c_2\};$$
$$I\{Y^c_2\}; \ldots, R\{Y^c_N\}; I\{Y^c_N\}] \quad \text{(Equation 1)},$$

where $R\{\bullet\}$ and $I\{\bullet\}$ denote the real and the imaginary parts of the argument. Each column vector $y^c_m$, $\forall m=1, \ldots, U$ of the matrix $Y^c$ (the mth training sample for the dictionary c) consists of the radar echoes received from the N spatial cells of interest when observing the target moving with cth basic direction, therefore adding spatial information about the observed extended target to the training data.

The column vectors in Yc can be represented using the following linear model:

$$y^c_m = D^c \alpha^c_m + n^c_m \quad \text{(Equation 2)},$$

where $n^c_m$ is the $2KN \times 1$ additive noise vector with the limited energy, $\|n^c_m\|^2_2 < \epsilon$, that models additive noise and the deviation from the model, $D^c$ is the $2KN \times J$ possibly overcomplete $(J > 2KN)$ dictionary with J atoms, and $\alpha^c_m$ is the $J \times 1$ sparse vector of coefficients indicating atoms of $D^c$ that represent data vector $y^c_m$. The dictionary $D^c$ and the corresponding vectors of the sparse coefficients $\alpha^c_m$, $m=1, \ldots, U$ can be learned from the training data by solving the following optimization problem:

$$(\check{D}^c, \check{A}^c) = \arg \min_{Dc, Ac} \frac{1}{2}\|D^c \check{A}^c - Y^c\|2F + \xi \sum_{m=1}^{U} \|\alpha^c_m\|1 \quad \text{(Equation 3)},$$

where $\|.\|$ is the matrix Frobenious norm, and the $J \times U$ matrix $A^c = [\alpha^c_1, \alpha^c_2, \ldots, \alpha^c_u]$ contains the sparse decomposition coefficients of the columns of the training data matrix $Y^c$. Minimization of the first summand in Equation 3 decreases the error between the original data and its representation, while minimization of the second summand preserves the sparsity of the obtained solution. The coefficient $\xi$ controls the trade-off between the reconstruction error and sparsity. The optimization problem in Equation 3 can be numerically solved using modern convex optimization techniques, for example the SPArse Modeling Software (SPAMS) toolbox. \

Because Micro-Doppler signatures for different targets' motion directions may have similarities, in one embodiment a non-class-specific dictionary is constructed, which contains characteristics of the C basic directions:

$$D_{2KN \times JC} = [D^1, D^2, \ldots, D^C]. \quad \text{(Equation 4)}$$

In this example, every measurement is represented as the combination of the selected basic directions of motion, while the corresponding decomposition coefficients are used as the features for classification or regression. Accordingly, in one embodiment, the learned dictionaries are used to represent as many data variations as possible.

In the above-referenced second stage of this example, the signature vectors are generated using the dictionary D for features extraction. In one embodiment, Let $\Lambda_t = \{(X^1_1, \theta^1), \ldots, (X^1_{Ft}, \theta^1), \ldots, (X^{Ct}_1, \theta^{Ct}), \ldots, (X^{Ct}_{Ft}, \theta^{Ct})\}$ be a regression training data set, where each one of the $F_t$ data blocks $X^{ct}_f$, $f=1, \ldots, F_t$ is an $X_t \times N$ matrix that contains a slow-time radar echoes received from N spatial cells while observing target moving at direction $\theta^{ct}$.

Also in this example, $T_F$ defines the target observation period required for the decision on the target motion direction. For the pulse repetition period $T_r$, the target observation time $T_F$ and the dimensionality of the regression training data vector $X_t$ are related in the following way: $X_t = T_F/T_r$. In order to represent more directions of motion in the regression training data without increasing the number of dictionaries C, we assume that _t contains the radar data from the larger number of different directions than $\Lambda_t$ (i.e. $\Lambda_t \in \Lambda_t$).

Each of the N columns of $X^{ct}_f$ is split into $U_t$ overlapping frames of the size K to form $K \times U_t$ matrices $Y^{ct}_{fi}$, $i=1, \ldots, N$. Similarly to Equation 1 above, these matrices are combined into an $2KN \times U_t$ sample matrix $Y^{ct}_f$. The columns of $Y^{ct}_f$ can be represented by the dictionary D by solving the following convex optimization problem:

$$\check{A}^{ct}_f = \arg \min_{Act} \frac{1}{2} \|DA^{ct}_f - Y^{ct}_f\|^2_F + \xi \sum_{j=1}^{U_t} \|\alpha^{ct}_{fj}\|1 \quad \text{(Equation 5)},$$

where $A^{ct}_f = [\alpha^{ct}_{f1}, \alpha^{ct}_{f2}, \ldots \alpha^{ct}_{fUt}]$ is a $JC \times U_t$ matrix of corresponding sparse decompositions. The $JC \times 1$ vector $\alpha^c_{fj} = [(\alpha^{ct}_{fj})1, \ldots, (\alpha^{ct}_{fj})J, \ldots, (\alpha^{ct}_{fj})JC]^T$, which is the sparse representation of the jth data sample from $Y^{ct}_f$ in the merged dictionary D, contains the decomposition coefficients of the $c_t$th target's direction in the basis constructed from the C basic directions. The contribution of the cth basic direction to the decomposition of the data matrix $Y^{ct}_f$ can be obtained by the summation of the absolute values of all decomposition coefficients that correspond to the basic direction (c) over $U_t$ data samples:

$$(\beta^{ct}_f)c = \sum_{j=1}^{U_t} \sum_{i=(c-1)J+1}^{cJ} \|(\alpha^{ct}_{fj})i\|^2. \quad \text{(Equation 6)}$$

The vector $\beta^{ct}_f = [(\beta^{ct}_f)1, (\beta^{ct}_f)2, \ldots, (\beta^{ct}_f)C]^T$ can be considered as the energy signature of the data samples $Y^{ct}_f$, where each entry of the $\beta^{ct}_f$ represents the energy contributed by the corresponding basic direction of motion. Using the signature vectors as features reduces the dimensionality of the data from $X_t$ to the number of basic directions C. In addition, the signature vectors capture information about relations between different directions of motion. In one embodiment, the summation in Equation 6 over relatively small number of samples $U_t$ in $Y^{ct}_f$ is expected to provide significantly higher robustness of the energy signature. After the signature vectors are extracted from $F_t$ training data blocks for each one of the $C_t$ different directions the following regression training data set can be constructed: $\Gamma_t = \{(B^1, \theta^1), (B^2, \theta^2), \ldots, (B^{Ct}, \theta^{Ct})\}$, where $B^{ct} = [\beta^{ct}_1, \beta^{ct}_2, \ldots, \beta^{ct}_{Ft}]$, $c_t = 1, \ldots, C_t$. In one embodiment, the sparse-learning-based feature extraction from the radar micro-Doppler data and the energy signatures can be used for various types of classification of the object, such as the object's motion direction estimation, pedestrian activities classification, and ground moving targets recognition.

In various other embodiments, other classification techniques may be used. For example, in one embodiment the object of 410 is classified at 424 based upon the three dimensional representation of 422 and a circular regression model. For example, in one such embodiment, the data from the feature vectors of the three dimensional representation are defined on a circle (with respect to the sin and cosine functions), and circular regression models are applied to overcome any discontinuity issues. In various embodiments, the objects may be classified at 424 using the energy signatures of 422 by using any number of different techniques, such as, by way of example, support vector machine (SVM), mathematical linked pair (MLP), and other techniques, such as those discussed above.

The objects may be tracked over time at 426, for example by tracking changes in movement and/or position of the objects using the received radar signals of 406, the location determined at 412, and the classification of 424. In addition, in one embodiment, the tracking of the object at 426 is performed by a processor, such as the processing unit 226 and/or the processor 240 of FIG. 1.

Vehicle actions may be initiated as appropriate at 428 based upon the classification and/or tracking. In addition, in one embodiment, the actions of 428 are performed by a processor, such as the processing unit 226 and/or the processor 240 of FIG. 1. In one example, in one embodiment, if an object is classified as an object of concern (e.g., a pedestrian, bicycle, other vehicle, and/or other large object) and the distance between the vehicle 10 and the tracked object is less than a predetermined threshold (or an estimated time of contact between the vehicle 10 and the tracked object) under their current respective trajectories is less than a predetermined threshold), then an alert (e.g., a visual or audio alert to the driver) may be provided and/or an automatic vehicle control action (e.g., automatic braking and/or automatic steering) may be initiated at 428, for example by a processor outputting one or more control signals for the steering system 150 and/or the braking system 160 of FIG. 1.

By way of further example, in one embodiment, if the host vehicle 10 is determined to be in contact (or soon to be in contact) with the object, then the action(s) at 428 may further depend upon the classification of 424 as to the type of the object. For example, if the object is classified at 424 as being a pedestrian, then a first set of actions may be taken at 428 to reduce the stiffness of the host vehicle 10, for example by opening a hood of the host vehicle 10 for protection of the pedestrian. Conversely, if the object is classified at 424 as being a brick wall, then a second set of actions may instead be taken at 428 to increase the stiffness of the host vehicle 10 for protection of the occupants of the host vehicle 10.

In various embodiments, the method 400 may terminate at 430 when the action is complete, or when further use of the radar system and/or the method 400 is no longer required (e.g. when the ignition is turned off and/or the current vehicle drive and/or ignition cycle terminates).

Figure 5:
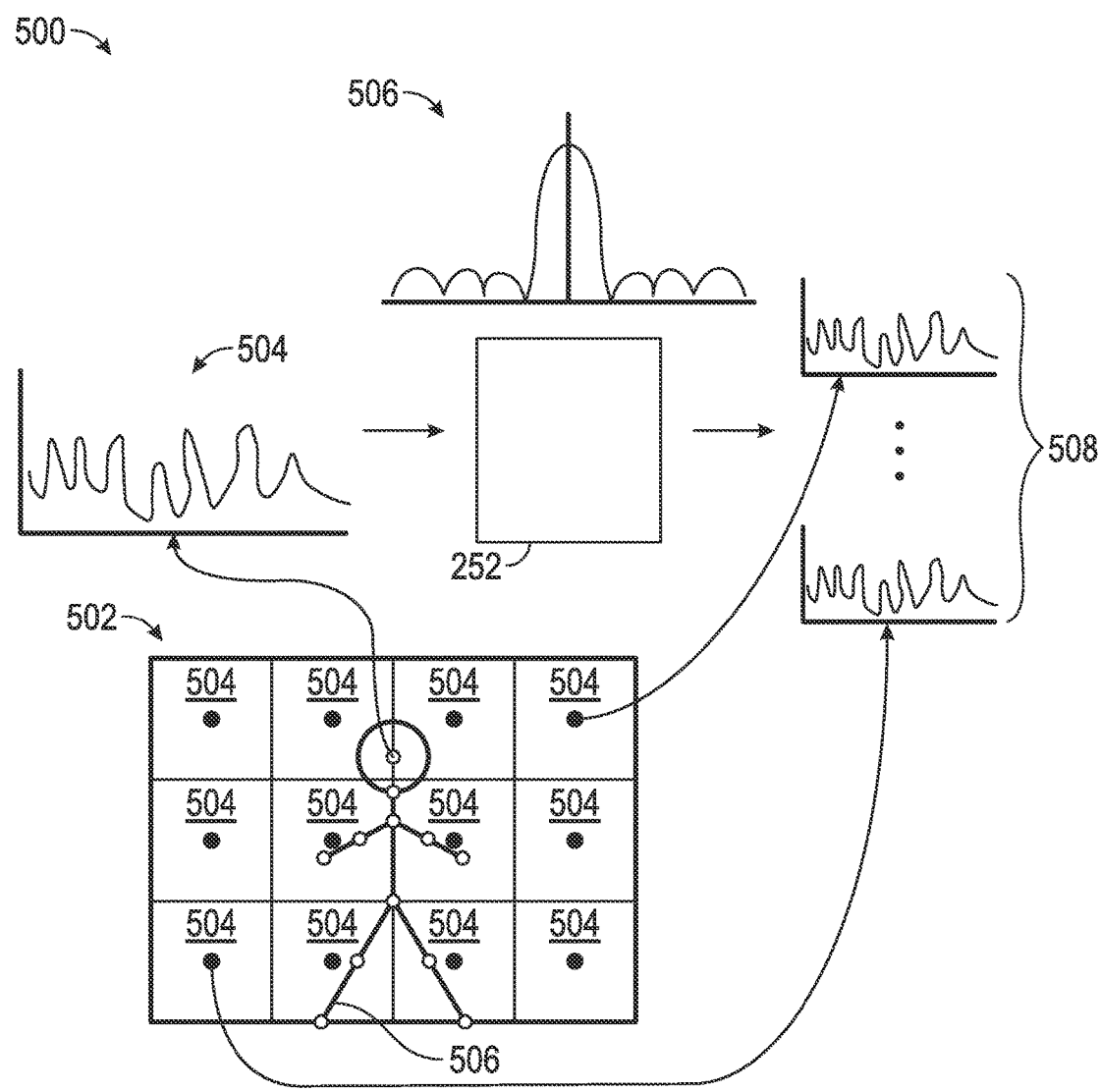
FIG. 5 provides a flow diagram corresponding to implementation of the method of FIG. 4 in connection with the control system of FIGS. 1-3, in accordance with an exemplary embodiment.

With reference to FIG. 5, a flow diagram 500 is provided with respect to the implementation of certain steps of the method 400 of FIG. 4, and that can be implemented in connection with the control system 12 of FIGS. 1-3 and/or the components thereof, in accordance with an exemplary embodiment. As depicted in FIG. 5, in one embodiment, at 502, radar signals of various cells 504 (that were originally transmitted by the transmitters 220 of FIG. 2) are deflected from the object 506 (a pedestrian, as depicted in the exemplary embodiment of FIG. 5). In one embodiment, the radar signals are received by the receivers 222 of FIG. 2 at 504 (corresponding to 406 of FIG. 4) and are filtered at 506 (corresponding to 408 of FIG. 4), for example using a filter bank stored in the memory 242 of FIG. 2 as stored values 252 thereof. The feature vectors are then generated at 508 for the radar signals (corresponding to 420 of FIG. 4).

Figure 6A:
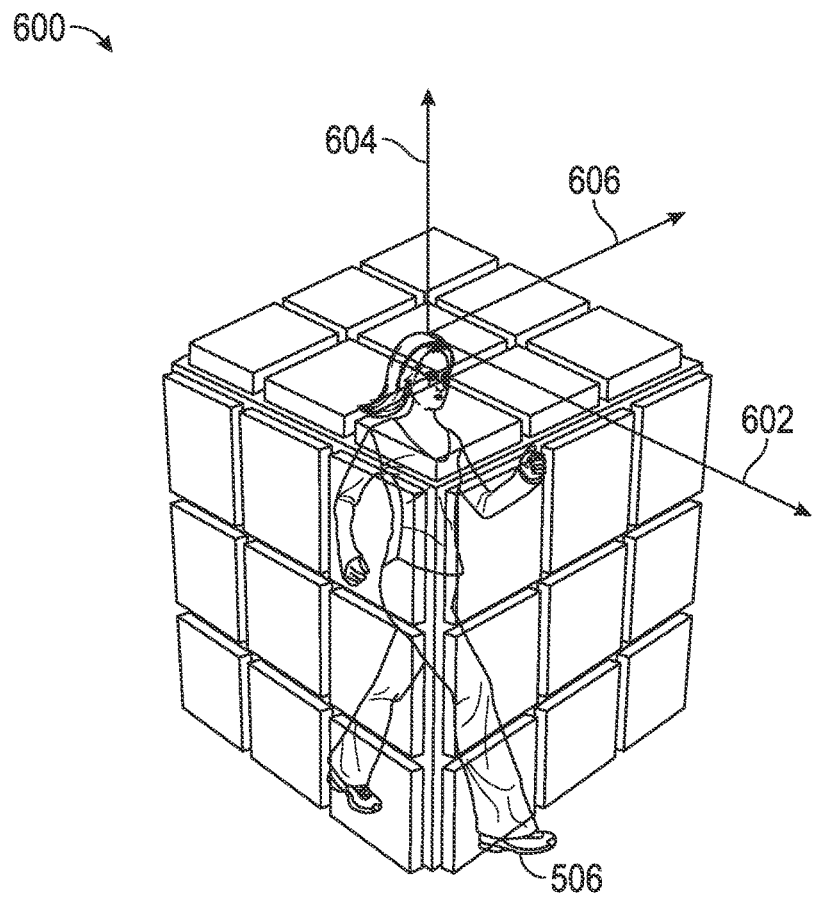
FIGS. 6A and 6B provide an exemplary illustration of a three dimensional representation generated using the method of FIG. 4 in connection with the control system of FIGS. 1-3 and the flow diagram of FIG. 5, as compared with a typical two dimensional video image, in accordance with an exemplary embodiment.
Figure 6B:
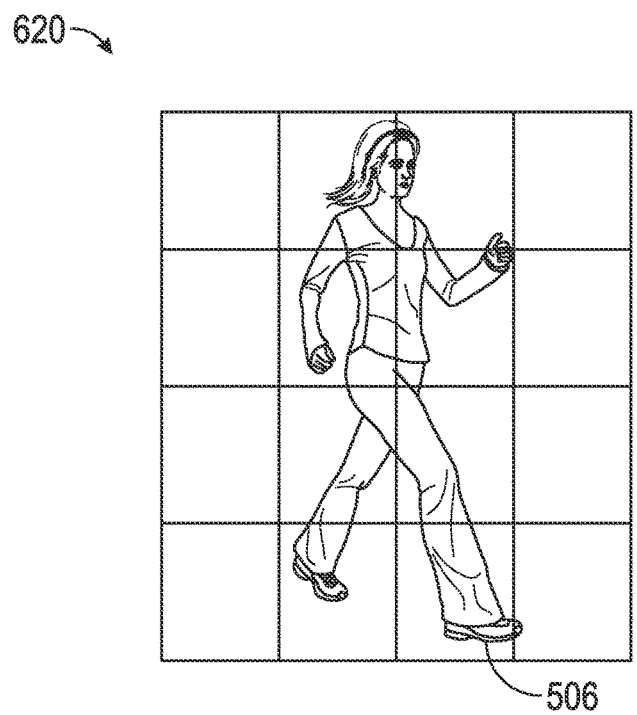

FIGS. 6A and 6B provide an exemplary illustration of a three dimensional representation 600 generated using the method 400 of FIG. 4 in connection with the control system of FIGS. 1-3 and the flow diagram of FIG. 5, as compared with a two-dimensional video image, in accordance with an exemplary embodiment. Specifically, as shown in FIG. 6A, a three dimensional representation 600 (corresponding to 422 of FIG. 4) is provided for the object 506 (in this example, a pedestrian). The three dimensional representation 600 is portrayed on a three dimensional array with a first direction 602 corresponding to an azimuth angle of the object 506 with respect to the host vehicle 10 (corresponding to 414 of FIG. 4), a second direction 604 corresponding to the elevation angle of the object 506 with respect to the host vehicle 10 (corresponding to 416 of FIG. 4), and a third direction 606 corresponding to the range of the object 506 with respect to the host vehicle 10 corresponding to 418 of FIG. 4).

A two dimensional representation 620 of the same object 506 (in this example, a pedestrian) is provided in FIG. 6A for comparison purposes. The two dimensional representation 620 for example, would be produced by a typical video camera. As shown in FIGS. 6A and 6B, the three dimensional representation 600 of FIG. 6B can potentially provide significantly greater detail, to thereby potentially improve the latency and accuracy of the classification of 424 (and that associated tracking of 426 and actions of 428) of FIG. 4.

Methods and systems are provided herein for classifying objects for radar systems of vehicles. The disclosed methods and systems provide for the classification of objects using based upon a three dimensional representation of the objects using received radar signals of the radar system 103.

It will be appreciated that the disclosed methods, systems, and vehicles may vary from those depicted in the Figures and described herein. For example, the vehicle 10, the radar control system 12, the radar system 103, the controller 104, and/or various components thereof may vary from that depicted in FIGS. 1-3 and described in connection therewith. In addition, it will be appreciated that certain steps of the method 400 may vary from those depicted in FIGS. 4-6 and/or described above in connection therewith. It will similarly be appreciated that certain steps of the method described above may occur simultaneously or in a different order than that depicted in FIGS. 4-6 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method for controlling a radar system of a vehicle, the radar system having a plurality of transmitters and a plurality of receivers, the method comprising the steps of:
transmitting, via the plurality of transmitters, a first plurality of radar signals from the vehicle;
receiving, via the plurality of receivers, a second plurality of radar signals pertaining to an object that is in proximity to a roadway on which the vehicle is travelling, the second plurality of radar signals directed from the object after the first plurality of radar signals contact the object;
determining, via a processor, a location of the object with respect to the vehicle based on the second plurality of radar signals;
determining, via the processor, an azimuth angle for the object with respect to the vehicle based on the second plurality of radar signals;
determining, via the processor, an elevation angle for the object with respect to the vehicle based on the second plurality of radar signals;

determining, via the processor, a range for the object with respect to the vehicle based on the second plurality of radar signals;
generating, via the processor, a plurality of feature vectors based on the second plurality of radar signals, the location, the azimuth angle, the elevation angle, and the range;
generating, via the processor, a three dimensional representation of the object using the plurality of feature vectors via association of the second plurality of radar signals to a three dimensional array, the three dimensional representation comprising a union of the plurality of feature vectors over the three dimensional array, wherein the three dimensional array is constructed such that the three dimensional array has a first dimension based on the azimuth angle, a second dimension based on the elevation angle, a third dimension based on the range, and a center that is based on the location of the object;
extracting features from the second plurality of radar signals using the three dimensional representation of the object; and
classifying, via the processor, the object based on the feature extraction.

2. The method of claim 1, further comprising:
classifying the object based upon the three dimensional representation and a learned dictionary model.

3. The method of claim 1, further comprising:
classifying the object based upon the three dimensional representation and a circular regression model.

4. A radar control system for a vehicle, the radar control system comprising:
one or more transmitters configured to transmit transmitted radar signals from the vehicle;
a plurality of receivers configured to receive return radar signals after the transmitted radar signals are deflected from an object proximate the vehicle; and
a processor coupled to the plurality of receiver and configured to:
determine a location of the object with respect to the vehicle based on the return radar signals;
determine an azimuth angle for the object with respect to the vehicle based on the return radar signals;
determine an elevation angle for the object with respect to the vehicle based on the return radar signals;
determine a range for the object with respect to the vehicle based on the return radar signals;
generate a plurality of feature vectors based on the return radar signals, the location, the azimuth angle, the elevation angle, and the range;
generate a three dimensional representation of the object using the plurality of feature vectors via association of the return radar signals to a three dimensional array, the three dimensional representation comprising a union of the plurality of feature vectors over the three dimensional array, wherein the three dimensional array is constructed such that the three dimensional array has a first dimension based on the azimuth angle, a second dimension based on the elevation angle, a third dimension based on the range, and a center that is based on the location of the object;
extract features from the return radar signals using the three dimensional representation of the object; and
classify the object based on the compressive sensing feature extraction.

5. The radar control system of claim 4, wherein the processor is further configured to classify the object based upon the three dimensional representation and a learned dictionary model.

6. The radar control system of claim 4, wherein the processor is further configured to classify the object based upon the three dimensional representation and a circular regression model.

7. A computer system for a radar system of a vehicle, the radar system having a plurality of transmitters and a plurality of receivers, the computer system comprising:
a non-transitory, computer readable storage medium storing a program, the program configured to:
transmit, via the plurality of transmitters, a first plurality of radar signals from the vehicle;
receive, via the plurality of receivers, a second plurality of radar signals pertaining to an object that is in proximity to a roadway on which the vehicle is travelling, the second plurality of radar signals directed from the object after the first plurality of radar signals contact the object;
determine a location of the object with respect to the vehicle based on the second plurality of radar signals;
determine an azimuth angle for the object with respect to the vehicle based on the second plurality of radar signals;
determine an elevation angle for the object with respect to the vehicle based on the second plurality of radar signals;
determine a range for the object with respect to the vehicle based on the second plurality of radar signals;
generate a plurality of feature vectors based on the second plurality of radar signals, the location, the azimuth angle, the elevation angle, and the range;
generate a three dimensional representation of the object using the plurality of feature vectors via association of the second plurality of radar signals to a three dimensional array, the three dimensional representation comprising a union of the plurality of feature vectors over the three dimensional array, wherein the three dimensional array is constructed such that the three dimensional array has a first dimension based on the azimuth angle, a second dimension based on the elevation angle, a third dimension based on the range, and a center that is based on the location of the object;
extract features from the second plurality of radar signals using the three dimensional representation of the object; and
classify the object based on the compressive sensing feature extraction.

8. The computer system of claim 7, wherein the program is further configured to classify the object based upon the three dimensional representation and a learned dictionary model.

9. The computer system of claim 7, wherein the program is further configured to classify the object based upon the three dimensional representation and a circular regression model.

10. The method of claim 1, wherein the step of extracting the features comprises extracting the features from the second plurality of radar signals using the three dimensional representation of the object by performing, via the processor, compressive sensing feature extraction.

11. The method of claim 1, wherein:
the step of extracting the features comprises extracting the features utilizing a radar signal decomposition dictionary in which radar signals are expressed in a compacted manner, utilizing smart feature extraction.

12. The method of claim 1, wherein:
the step of extracting the features comprises extracting the features utilizing a signal processing technique for acquiring and reconstructing radar signals by finding solutions to undetermined linear systems.

13. The method of claim 11, wherein
the step of extracting the features comprises extracting the features utilizing the signal processing technique for acquiring and reconstructing radar signals by finding the solutions to undetermined linear systems using a least squares mathematical technique.

14. The method of claim 1, wherein the step of classifying the object comprises:
performing a training stage prior to a current vehicle ignition cycle, during which a dictionary is built per object class category;
storing the dictionary in a memory; and
classifying the object during the current ignition cycle based on a comparison of results of the feature extraction with the dictionary.

15. The method of claim 14, further comprising:
merging each class dictionary for each class together, generating a merged dictionary;
subsequently, decomposing each signal into the merged dictionary;
building energy signatures using components of the energy signatures that comprise a sum of absolute decomposition coefficients per each class, the energy signatures included in the merged dictionary;
storing the merged dictionary in the memory; and
classifying the object during the current ignition cycle based on a comparison of results of the feature extraction with the merged dictionary.

16. The method of claim 14, further comprising:
utilizing dictionary learning for the dictionary based on a temporal gradient that captures a Doppler frequency shift with respect to the second plurality of radar signals that are deflected from the object.

17. The method of claim 16, wherein a time interval for the Doppler frequency shift is proportional to relative changes in the object's position with respect to the vehicle.

18. The method of claim 14, further comprising:
reducing a data dimensionality of possible directions of motion for the object, using the dictionary.

19. The method of claim 18, further comprising:
estimating a direction of motion for the object in two stages, namely:
a first phase, in which a plurality of dictionaries are generated using training data, prior to the current ignition cycle; and
a second phase, in which radar measurements of the second plurality of radar signals that are dependent upon the direction of motion of the object are decomposed, using the plurality of dictionaries.

20. The method of claim 19, wherein:
in the first phase, the plurality of dictionaries are generated using a training data set that includes radar echoes received from spatial cells of interest when observing the object moving in particular directions, along with an additive noise vector that models additive noise, and utilizing Micro-Doppler signatures for different objects, and wherein each measurement is represented as a combination of selected basic directions of motion of the object, while corresponding decomposition coefficients are used as features for inclusion in the dictionary; and
in the second phase, a classification is generated for the object using the three dimensional representation, including Micro-Doppler signatures thereof, in comparison with the plurality of dictionaries.

* * * * *